(12) United States Patent
McFarland et al.

(10) Patent No.: US 7,606,193 B2
(45) Date of Patent: *Oct. 20, 2009

(54) METHODS FOR IMPLEMENTING A DYNAMIC FREQUENCY SELECTION (DFS) FEATURE FOR WLAN DEVICES

(75) Inventors: William J. McFarland, Los Altos, CA (US); Michael R. Green, Needham, MA (US)

(73) Assignee: Atheros Communications, Inc., Santa Clara, CA (US)

( * ) Notice: Subject to any disclaimer, the term of this patent is extended or adjusted under 35 U.S.C. 154(b) by 1297 days.

This patent is subject to a terminal disclaimer.

(21) Appl. No.: 10/406,049

(22) Filed: Apr. 2, 2003

(65) Prior Publication Data

US 2004/0151137 A1 Aug. 5, 2004

Related U.S. Application Data

(60) Provisional application No. 60/444,066, filed on Jan. 30, 2003.

(51) Int. Cl.
*H04Q 7/00* (2006.01)

(52) U.S. Cl. .................. 370/329; 370/250; 370/343; 370/342; 370/441; 370/474; 370/480; 370/468; 342/57; 342/195; 342/159; 342/192; 455/63.1; 455/296; 455/423; 455/67.13

(58) Field of Classification Search ............. 455/67.13; 370/329, 250, 332, 333, 343, 441, 342, 474, 370/480; 342/372, 188, 159, 89, 165, 162, 342/57

See application file for complete search history.

(56) References Cited

U.S. PATENT DOCUMENTS

| 5,329,283 | A | * | 7/1994 | Smith | 342/25 F |
| 5,355,522 | A | * | 10/1994 | Demange | 455/62 |
| 5,598,437 | A | * | 1/1997 | Gourse | 375/308 |
| 5,680,142 | A | * | 10/1997 | Smith et al. | 342/372 |
| 5,809,335 | A | * | 9/1998 | Kamiya | 710/22 |
| 5,821,896 | A | * | 10/1998 | Nakano et al. | 342/90 |

(Continued)

OTHER PUBLICATIONS

Draft Supplement to Standard for Telecommunications and Information Exchange Between Systems-LAN/MAN Specific Requirements-; Part 11: Wireless Medium Access Control (MAC) and Physical; IEEE Std 802.11h/DO.1, Jul. 2001; 29 pages.

(Continued)

*Primary Examiner*—Marceau Milord
(74) *Attorney, Agent, or Firm*—Bever, Hoffman & Harms, LLP; Jeanette S. Harms

(57) ABSTRACT

Various regulatory domains promulgate standards to define how wireless devices should operate in certain frequency bands. The 5 GHz spectrum is of particular importance to certain regulatory domains because of radar systems also operating in this spectrum. To avoid interference with such radar systems, wireless devices operating in this spectrum should be able to detect radar and quickly vacate any channels currently used by the radar systems. Techniques are provided for performing startup scans for radar, identifying backup channels for a possible channel switch, and efficiently changing channels in the event of radar detection in the operating channel. These techniques advantageously meet current regulatory standards governing DFS while minimizing network startup delays and disruption to users during a radar event.

20 Claims, 12 Drawing Sheets

U.S. PATENT DOCUMENTS

| | | | | |
|---|---|---|---|---|
| 5,933,420 | A * | 8/1999 | Jaszewski et al. | 370/329 |
| 5,990,833 | A * | 11/1999 | Ahlbom et al. | 342/417 |
| 6,122,261 | A * | 9/2000 | Fernandes et al. | 370/320 |
| 6,279,158 | B1 * | 8/2001 | Geile et al. | 725/126 |
| 6,483,828 | B1 * | 11/2002 | Balachandran et al. | 370/342 |
| 6,493,666 | B2 * | 12/2002 | Wiese, Jr. | 704/230 |
| 6,615,074 | B2 | 9/2003 | Mickle et al. | 600/509 |
| 6,647,053 | B1 * | 11/2003 | Garces | 375/132 |
| 6,675,012 | B2 * | 1/2004 | Gray | 455/423 |
| 6,697,013 | B2 * | 2/2004 | McFarland et al. | 342/159 |
| 6,735,178 | B1 * | 5/2004 | Srivastava et al. | 370/252 |
| 6,738,599 | B2 * | 5/2004 | Black et al. | 455/62 |
| 6,870,815 | B2 * | 3/2005 | McFarland et al. | 370/250 |
| 6,891,496 | B2 * | 5/2005 | Husted et al. | 342/57 |
| 6,922,551 | B1 * | 7/2005 | Bristow et al. | 455/103 |
| 6,954,171 | B2 * | 10/2005 | Husted et al. | 342/57 |
| 6,965,942 | B1 * | 11/2005 | Young et al. | 709/232 |
| 7,107,032 | B2 * | 9/2006 | Li | 455/296 |
| 7,113,806 | B2 * | 9/2006 | Gray | 455/552.1 |
| 7,120,138 | B2 * | 10/2006 | Soomro et al. | 370/343 |
| 7,123,592 | B2 * | 10/2006 | Geile et al. | 370/307 |
| 7,129,884 | B1 * | 10/2006 | Tehrani et al. | 342/20 |
| 7,133,686 | B2 * | 11/2006 | Hundal et al. | 455/465 |
| 7,140,040 | B2 * | 11/2006 | McBrearty et al. | 726/23 |
| 7,155,230 | B2 * | 12/2006 | Tsien | 455/450 |
| 7,206,840 | B2 * | 4/2007 | Choi et al. | 709/225 |
| 7,269,151 | B2 * | 9/2007 | Diener et al. | 370/329 |
| 7,352,728 | B2 * | 4/2008 | Soomro | 370/338 |
| 2003/0107512 | A1 | 6/2003 | McFarland et al. | |
| 2003/0206130 | A1 | 11/2003 | Husted et al. | |
| 2004/0042396 | A1 | 3/2004 | Brown et al. | |

OTHER PUBLICATIONS

Working Document Towards A Preliminary Draft New Recommendation On Dynamic Frequency Selection In 5GHz RLANS; Int'l. Telecommunication Union, Radiocommunication Study Groups; Nov. 13, 2001; 40 pgs.

Attachment 4 From Oct 8B Chairmans Report; Dec. 18, 2002; 13 pgs; author unknown.

* cited by examiner

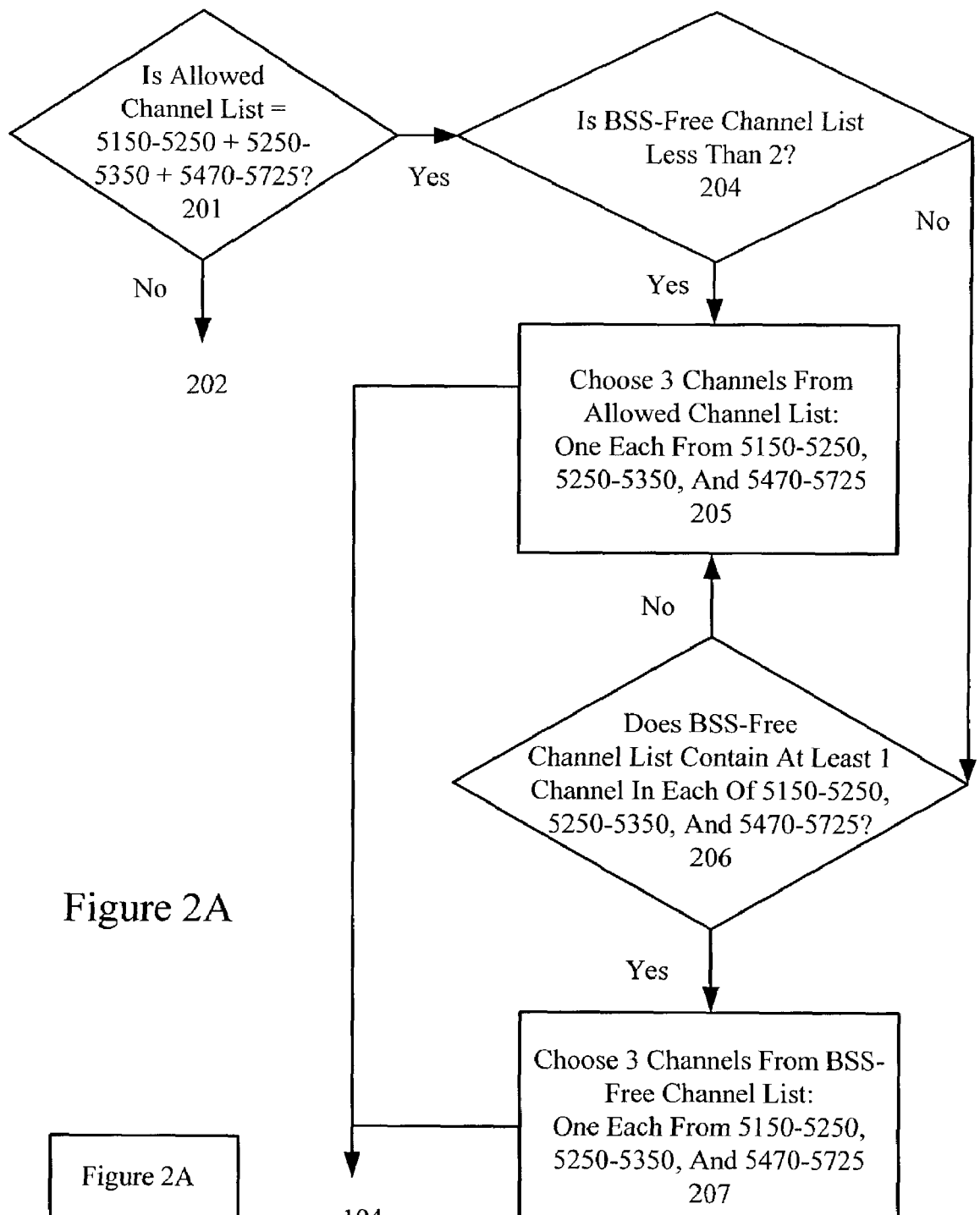
Figure 2A
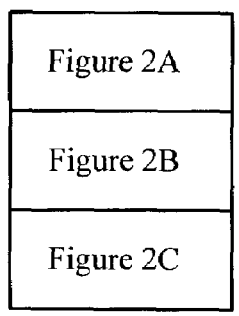

METHODS FOR IMPLEMENTING A DYNAMIC FREQUENCY SELECTION (DFS) FEATURE FOR WLAN DEVICES

CLAIM OF PRIORITY

This application claims priority to U.S. provisional application Ser. No. 60/444,066, filed Jan. 30, 2003 entitled "Methods For Implementing A Dynamic Frequency Selection (DFS) Feature For WLAN Devices".

BACKGROUND OF THE INVENTION

1. Field of the Invention

The present invention relates to wireless local area network (WLAN) devices and particularly to techniques in WLAN devices for performing startup scans for radar, identifying backup channels for a channel switch, and efficiently changing channels in the event of radar detection in the operating channel.

2. Description of the Related Art

Wireless local area network (WLAN) devices operating in the 5 GHz spectrum coexist with radar systems. Various regulatory standards (e.g. the draft European Telecommunications Standards Institute (ETSI) EN 301 893, version V1.2.1, published 2002-07) require that a dynamic frequency selection (DFS) feature be incorporated in 5 GHz WLAN devices. This DFS feature should switch operating channels in the presence of co-channel radar and uniformly spread operation across a wide frequency range.

Regulatory standards typically provide simple guidelines for radar detection and/or avoidance of co-channel radar. For example, current European regulatory standards require that a 60 second scan of each allowed channel be completed before operation commences. Moreover, upon detection of a radar signal on the current operating channel, the WLAN device (i.e. an access point or a station) must cease communication within a short timeframe, e.g. 0.2-1.0 sec. Note that pending revisions to the European regulatory standards may require that aggregate transmission time of an access point or station be limited to a total of 260 ms counting from the instant a radar is detected. Other regulatory domains have proposed similar guidelines. For example, a draft IEEE 802.11h specification (which adapts the 802.11a standard to European regulations) suggests that stations respond to a channel switch announcement frame from an access point by ceasing data transmission, thereby avoiding harmful interference to the co-channel radar system.

However, these regulatory standards do not provide specific implementation details. Therefore, various proprietary solutions have been proposed. For example, U.S. patent application Ser. No. 10/039,451 (hereinafter McFarland), entitled "Radar Detection And Dynamic Frequency Selection For Wireless Local Area Networks", filed on Dec. 6, 2001 by Atheros Communications, Inc., and incorporated by reference herein, teaches how to efficiently detect co-channel radar. In McFarland, signal pulses are received as detected events. Any detected events that correspond to network traffic can be eliminated. At this point, any non-eliminated events can be examined to determine whether they correspond to radar signals. This examination can include identifying pulse repetition frequency, a pulse period, or a number of pulses in a pre-defined time period.

McFarland also teaches one technique to cease transmissions between an access point and its associated stations upon detection of radar. In this technique, a point coordination function (PCF), which is provided in the IEEE 802.11 standard, can be used to control which stations transmit and when they transmit. Specifically, a PCF beacon, which is sent by an access point, announces the beginning of a polling period, wherein all stations must wait until polled by that access point before transmitting. During the gap between the PCF beacon and the polling of the next station, the access point can perform a radar detection cycle. At the end of the radar detection cycle, the access point can proceed with normal PCF polling.

Other implementation techniques related to DFS are currently being developed. These techniques should include defining the specific algorithms for performing startup scans for radar, determining an acceptable backup channel for a possible channel switch, and efficiently switching channels in the case of radar detection in the operating channel. Preferably, these techniques should further include a mechanism whereby legacy stations, i.e. those stations that have not implemented the DFS functionality, can be easily controlled by the access point during a channel switching operation and, more often than not, can operate on the new channel.

SUMMARY OF THE INVENTION

Various regulatory and standards bodies promulgate standards to define how wireless devices should operate in certain frequency bands. The 5 GHz frequency band is of particular importance to regulatory authorities because of radar systems operating in portions of this band. Radar systems could be used by military, aviation, meteorological, and other governmental agencies. Therefore, because of the importance of these radar systems, wireless devices operating in the 5 GHz frequency bands must be able to detect radar and avoid any frequencies used by the radar systems. Detection and avoidance of radars is a key feature of the capability termed dynamic frequency selection (DFS). In accordance with one aspect of the present invention, techniques are provided for performing startup scans for radar, determining an acceptable backup channel for a possible channel switch, and efficiently switching channels in the event of radar detection in the operating channel. These techniques advantageously meet current regulatory standards governing DFS while minimizing network startup delays and disruption to users during a radar detection event.

The startup routine of a wireless device is typically time critical. Specifically, stations (and their human users) could think that a lengthy startup routine is a product fault. Access points may restart in response to an ineffective startup scan of available channels, thereby significantly decreasing the usability and the availability of a wireless network. Some regulatory domains require relatively long periods of time to verify that a channel is radar-free. For example, European regulations require that each channel be scanned for 60 sec to determine whether it is radar-free. Therefore, this requirement must be met while still minimizing the time spent for the startup routine.

In accordance with one aspect of the invention, the access point populates a short list of backup channels (e.g. one or two) during initial startup and stores this short list during normal operation. Backup channels can advantageously be used to perform a fast and non-disruptive channel switch in case radar is detected on the current channel. Using this short list of channels, which have been pre-scanned for radar per the required period (e.g. 60 sec), eliminates an otherwise lengthy startup routine (e.g. up to 19 channels×60 seconds=19 minutes).

During startup, the access point can quickly scan multiple channels for radar. In one embodiment, normal operation can begin on the first channel that is found without radar. During normal operation, the access point or one or more stations at the request of the access point can perform short background scans to identify additional radar-free channels. The scanning process can continue until one or two backup radar-free channels are found. At this point, the radar-free channel(s) can be stored in the access point for use during a future channel switch event.

Fortunately, the timing of these scans will advantageously vary, thereby avoiding the possibility that radar on the backup channel is transmitting radar bursts with a timing exactly coincident with the short periods during which the access point or station is not performing the short scans of the channel. Of importance, multiple short scans performed during normal operation on a selected backup channel results in effectively a full (e.g. 60 sec) scan for radars, as required by some regulatory standards.

Note that radar can transmit significant energy in multiple adjacent (i.e. both below and above) channels to the current channel of the WLAN device. Therefore, in accordance with one feature of the invention, selection of the backup channels can be performed to reduce the likelihood that the new channel is adjacent in frequency to the current channel. This selection process also advantageously meets the European requirement for uniform spreading of channels of operation. Moreover, because many legacy stations will not be capable of operating in some portions of the 5 GHz spectrum, i.e. the sub-band of 5470-5725 MHz, the selection process can be weighted such that most or all stations currently associated with the access point will be capable of operation on the new channel.

For example, in one embodiment of the invention, the access point can build a list of backup channels by choosing one channel from each sub-band in 5 GHz (i.e. 5150-5250 MHz, 5250-5350 MHz, and 5470-5725 MHz). Of importance, the random choice of channels distributed within each sub-band (as opposed to the random choice of channels using the complete range of channels) results in a pseudo-random list of backup channels that is weighted toward the lower end of the spectrum (i.e. 5150-5350 MHz). Because many legacy stations are not capable of operating in the 5470-5725 MHz sub-band, an access point that minimizes channel selection in this large sub-band can increase the likelihood of compatibility with such legacy devices.

Advantageously, few if any radars will be found operating in certain target regional domains (e.g. Europe) in the 5150-5250 MHz sub-band and pending European regulatory requirements may exempt devices from checking for radars in this sub-band. Moreover, relatively few radars are expected to be found in the 5250-5350 MHz sub-band. In contrast, the larger 5470-5725 MHz sub-band is expected to be occupied by commonly deployed meteorological radars in many countries. Therefore, this weighting also decreases the likelihood of encountering radar on the candidate backup channels.

In accordance with another aspect of the invention, the access point can also consider the presence of other WLAN devices already operating in certain bands. In one embodiment, a BSS-free channel list is populated from an allowed channel list of the current regional domain. The access point preferably chooses its backup channels from this BSS-free channel list. However, if the number of backup channels is too low, then the access point can instead choose its backup channels from the allowed channel list to remain in compliance with channel spreading rules.

When radar is detected on the current channel of operation, the access point can choose its backup channel from a radar-free channel list that is, in general, furthest in frequency (i.e. above or below) the current channel on which radar was detected. For example, if the current channel is in the sub-band of 5150-5250 MHz, then the access point can set the new channel to the most distant channel in the radar-free channel list. In a preferred embodiment, the channel switch process can advantageously prioritize the selection of backup channels in the sub-band of 5150-5350 MHz, which as noted above are less likely to contain radar energy and more likely to allow legacy stations to operate. For example, if the current channel is in the sub-band of 5250-5350 MHz and at least one backup channel is in the sub-band of 5150-5250 MHz, then the access point can set the new channel to the lowest channel in the radar-free channel list. In contrast, if the current channel is in the sub-band of 5250-5350 MHz and no backup channel is in the sub-band of 5150-5250 MHz, then the access point can set the new channel to the highest channel in the radar-free channel list. Finally, if the current channel is in the sub-band of 5470-5725 MHz, then the access point can set the new channel to the lowest channel in the radar-free channel list. This channel switching operation in combination with the backup channel selection (i.e. populating the radar-free channel list) advantageously minimizes network disruption to legacy and non-legacy station devices and significantly improves wireless network operation compared to a completely random channel switch.

Upon detection of radar on current channel of operation, the access point can broadcast a channel switch frame to all stations, thereby ensuring that all stations capable of interpreting this message will cease data transmission immediately. At this point, the access point can broadcast an additional control frame, i.e. a de-authenticate frame, to all stations. This de-authenticate frame, which is understood by all stations, causes them to immediately stop transmitting data to the access point and to revert back to a startup state.

Of importance, the de-authenticate frame is sent after the designated channel switch time. Without this timing, most if not all 802.11h compliant stations would respond to the de-authenticate frame by immediately ceasing communication with the access point, therefore losing the ability to perform the desired non-disruptive channel switch initiated by the channel switch process. By sending the de-authenticate frame at a designated time after a channel switch frame, any 802.11h compliant station that did receive, understand, and accept the channel switch frame will move from the current channel of operation before the de-authenticate frame is sent by the access point. Moreover, any non-802.11h compliant (i.e. legacy) stations will quickly cease their operation, thereby reducing harmful interference to co-channel radars as well as decreasing the time necessary to detect that the access point has left the channel and to initiate recovery procedures.

A method of performing a startup operation for an access point in a regulatory domain is also provided. Note that the regulatory domain has a frequency spreading requirement and the access point can only communicate using allowed channels in a spectrum. In this method, an allowed channel list can be populated with the allowed channels. A BSS-free channel list can be populated with any allowed channels having acceptable levels of current WLAN transmission thereon. Then, a radar-free channel list can be populated using the BSS-free channel list and the allowed channel list.

In accordance with one aspect of the invention, a first channel can be randomly selected from the radar-free channel list. If the first channel is in a first sub-band and the regulatory domain exempts scanning in the first sub-band, then the first channel can be designated as a current channel, a backup channel can be selected from the radar-free channel list in the first sub-band without scanning, and operation of the access point can begin with the first channel.

On the other hand, if the first channel is not in the first sub-band and the regulatory domain exempts scanning in the first sub-band, then a radar scan can be performed on each channel in the radar-free channel list, except any channel in the first sub-band. Similarly, if the first channel is in the first sub-band and the regulatory domain requires scanning in the first sub-band, then a radar scan can be performed on each channel in the radar-free channel list. In these two cases, any channel with radar in the radar-free channel list can be deleted. The above steps can be repeated until a predetermined number of channels remain in the radar-free channel list. At this point, a first channel in the radar-free channel list can be chosen and normal operation of the access point can begin with the first channel.

BRIEF DESCRIPTION OF THE DRAWINGS

FIGS. 2A, 2B, and 2C illustrate an exemplary process for populating a radar-free channel list based on an allowed channel list and a BSS-free channel list.

DETAILED DESCRIPTION OF THE DRAWINGS

In accordance with various aspects of the present invention now described in detail, techniques for performing startup scans for radar, determining an acceptable backup channel for a channel switch, and efficiently changing channels in the case of radar detection in the operating channel advantageously meet current regulatory standards governing DFS while minimizing network startup delays and disruption to users during a radar event.

Channel Selection During Startup/Restart of Access Point

Figure 1:
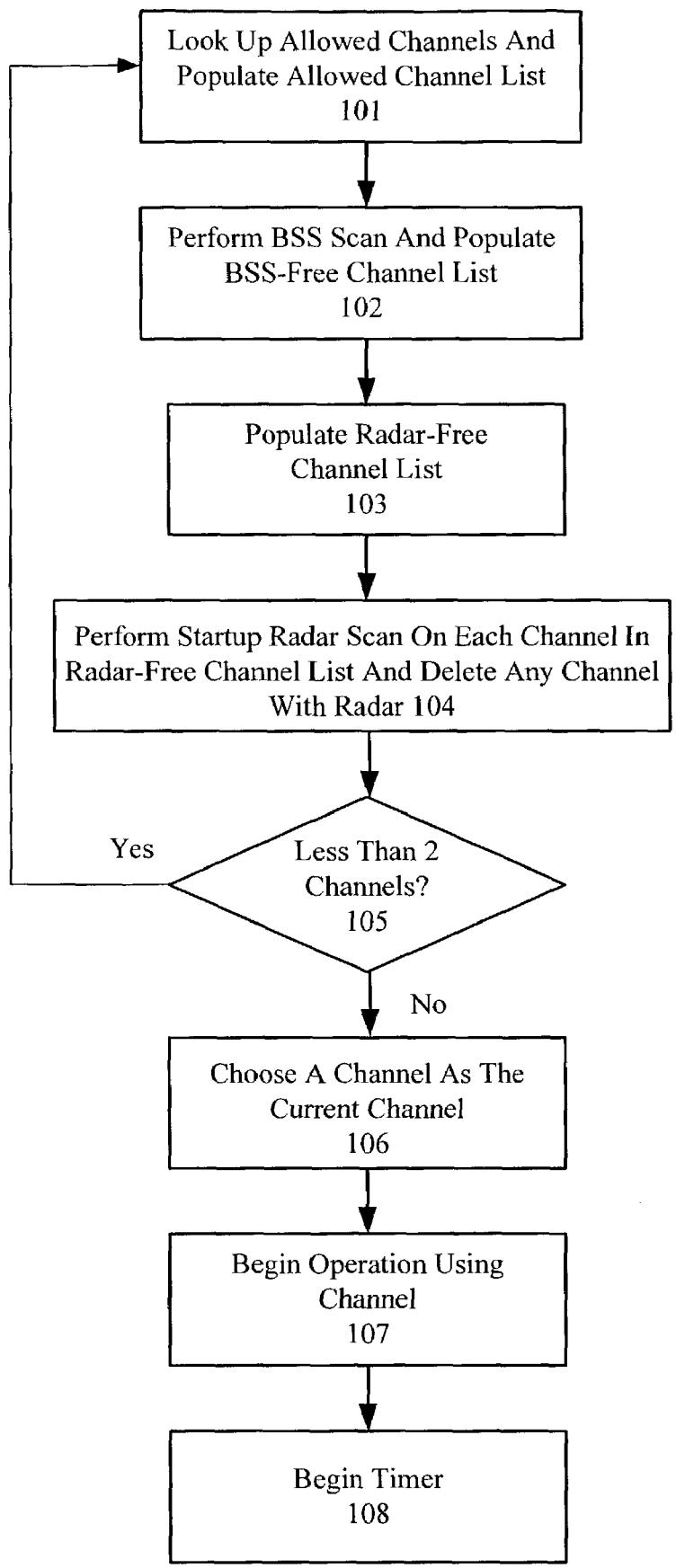
FIG. 1 illustrates an exemplary process for channel selection during startup/restart of an access point.

FIG. 1 illustrates an exemplary process for backup channel selection during startup/restart of an access point. In step 101, an access point can look up the channels allowed by the regulatory domain in which the access point will be operating. In one embodiment, the access point can access a lookup table (LUT) that includes known regulatory domains and associated allowed channels of operation. If the regulatory domain is Europe, then the allowed channels are within the following frequency ranges (also called sub-bands herein): 5150-5250 MHz (4 channels), 5250-5350 MHz (4 channels), and 5470-5725 MHz (11 channels). These allowed channels can be added to an allowed channel list. This process is called "populating" a list herein.

In step 102, the access point can perform a startup scan for Basic Service Sets (BSSs) on the allowed channel list. A BSS is a set of IEEE 802.11 compliant devices that operate as a full-connected wireless network. In one embodiment, this startup scan can take 200 ms per channel. Therefore, assuming that all sub-bands are allowed, this startup scan will last no more than 200 ms×19 channels=4 sec. At this point, the access point can populate a BSS-free channel list of allowed channels that are currently transmission free or have an acceptable level of current WLAN transmission thereon.

Figure 2B:
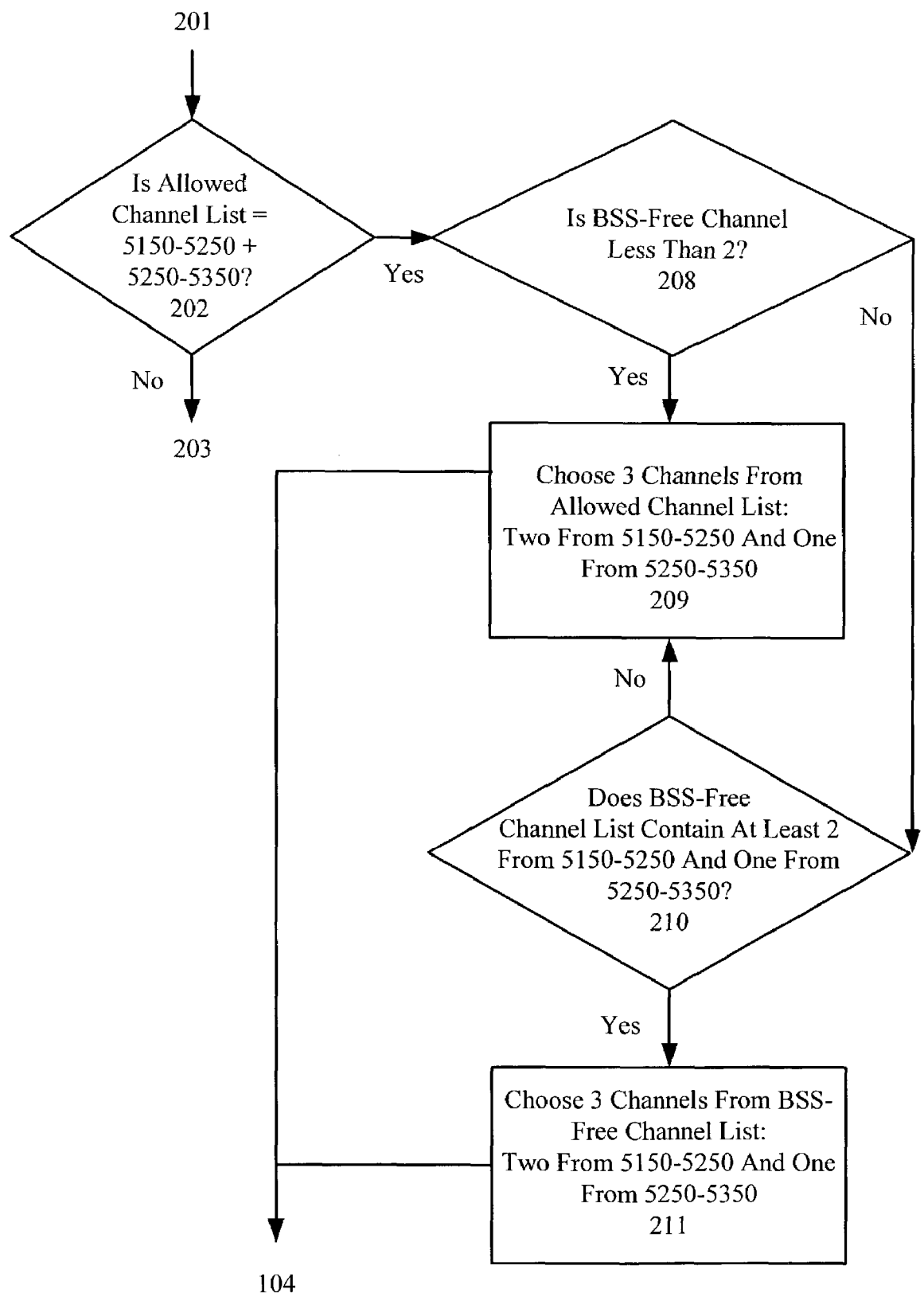

In step 103, the access point can populate a radar-free channel list using a process described in reference to FIG. 2. In the embodiment described in FIGS. 2A and 2B, two or three candidate channels are included in the radar-free channel list. Note that at this point, these candidate channels are not yet tested for radar.

In step 104, the access point can perform a radar scan on each candidate channel in the radar-free channel list. In one embodiment, this radar scan conforms to the current European standard of 60 sec for each channel. After this radar scan operation, the access point can delete any channel in which radar signals were detected from the radar-free channel list. Typically, at this point, the radar-free channel list will have 0, 1, 2, or 3 channels.

In step 105, if the radar-free channel list contains two or more channels, then the access point can randomly choose a channel from the radar-free channel list and set that channel as the current channel of operation in step 106. At this point, the access point can delete the current channel from the radar-free channel list, thereby leaving either one or two backup channels in this list. The access point can retain the radar-free channel list for backup in case radar is detected in the current channel. In step 107, the access point can begin beaconing and performing normal operations on the current channel. In one embodiment, the BSS-free channel list can be discarded after step 106 to conserve valuable storage area.

On the other hand, referring back to step 105, if the radar-free channel list contains less than two (i.e. 0 or 1) channels, then the access point can send a console message indicating that an insufficient number of channels were found clear of radars. Then, the process can return to step 101 to repeat the startup operation.

For regulatory domains that enforce the regulatory requirement where WLAN devices must not reoccupy a channel on which radar was detected (e.g. nominally for a period of at least 30 minutes after radar is detected), an additional protection can be implemented. In this case, the WLAN device can store the channel number(s) on which radar was detected along with a timestamp of the radar event associated with the channel(s). In one embodiment, this information can be stored in non-volatile memory. During normal operation, the timestamp can be updated periodically to countdown the required period (e.g. 30 minutes) at which time the non-reoccupancy flag can be removed. Upon a restart of the WLAN device, the candidate radar-free channel list (per FIG. 1, step 103) can be compared against the channel numbers(s) stored in non-volatile memory and appropriate channels can be removed. This list of non-reoccupancy channels can be flushed upon the $2^{nd}$ subsequent restart of the WLAN device using a separate lifetime flag (which could also be stored & decremented in non-volatile memory) that counts the number of restarts since the non-reoccupancy channel numbers were stored.

To fully realize the benefits of the short backup channel list (e.g. faster startup and less disruptive refresh of backup channels), the radar-free channel list should be populated in step 103 with certain considerations in mind. Specifically, the selection of backup channels should reduce the risk of a channel switch operation resulting in the access point moving to a channel in which the radar is still operating. Regulatory requirements do not currently dictate that a 5 GHz WLAN device take specific measures to avoid moving to a new channel occupied by radars after radar is detected in the current channel, other than the requirement that the new channel was previously checked for radars during an initial startup scan.

Of importance, radars may operate across wider transmission bandwidths than the WLAN device. Moreover, some radars, called frequency agile radars, may intentionally switch operation across multiple adjacent frequencies in a band of spectrum. Furthermore, other radars, such as transportable, airborne, or even fixed radars can operate intermittently or with a lengthy and irregular directional scanning sequence (a meteorological radar for instance). Additionally, because of the high out-of-band spurious emissions of nearby radars entering WLAN receivers with finite out-of-band rejection, WLAN devices located nearby radars will receive significant energy in channels adjacent to the current channel of operation. Thus, unfortunately, moving to a channel in which radar energy is still present is quite possible in the real world.

Therefore, a conventional backup channel list, even if refreshed per regulatory requirements (described in reference to FIG. 3A), may not protect against the access point performing a channel switch to a backup channel that either has radar or may be undesirably close in frequency to a channel with radar. Such a channel switch could require yet another channel switch with its associated disruption to network operation. This problem can be further complicated by the regulatory requirement to spread operation of WLAN devices across the full range of available spectrum.

In accordance with one feature of the invention, backup channel selection (i.e. populating the radar-free channel list) can be weighted to provide a wide range of channel frequencies in the 5 GHz spectrum while retaining the randomness required to achieve spreading of operation for WLAN devices. Additionally, the weighting can increase the likelihood that legacy stations are still able to operate when an access point performs a channel switch.

Figure 2C:
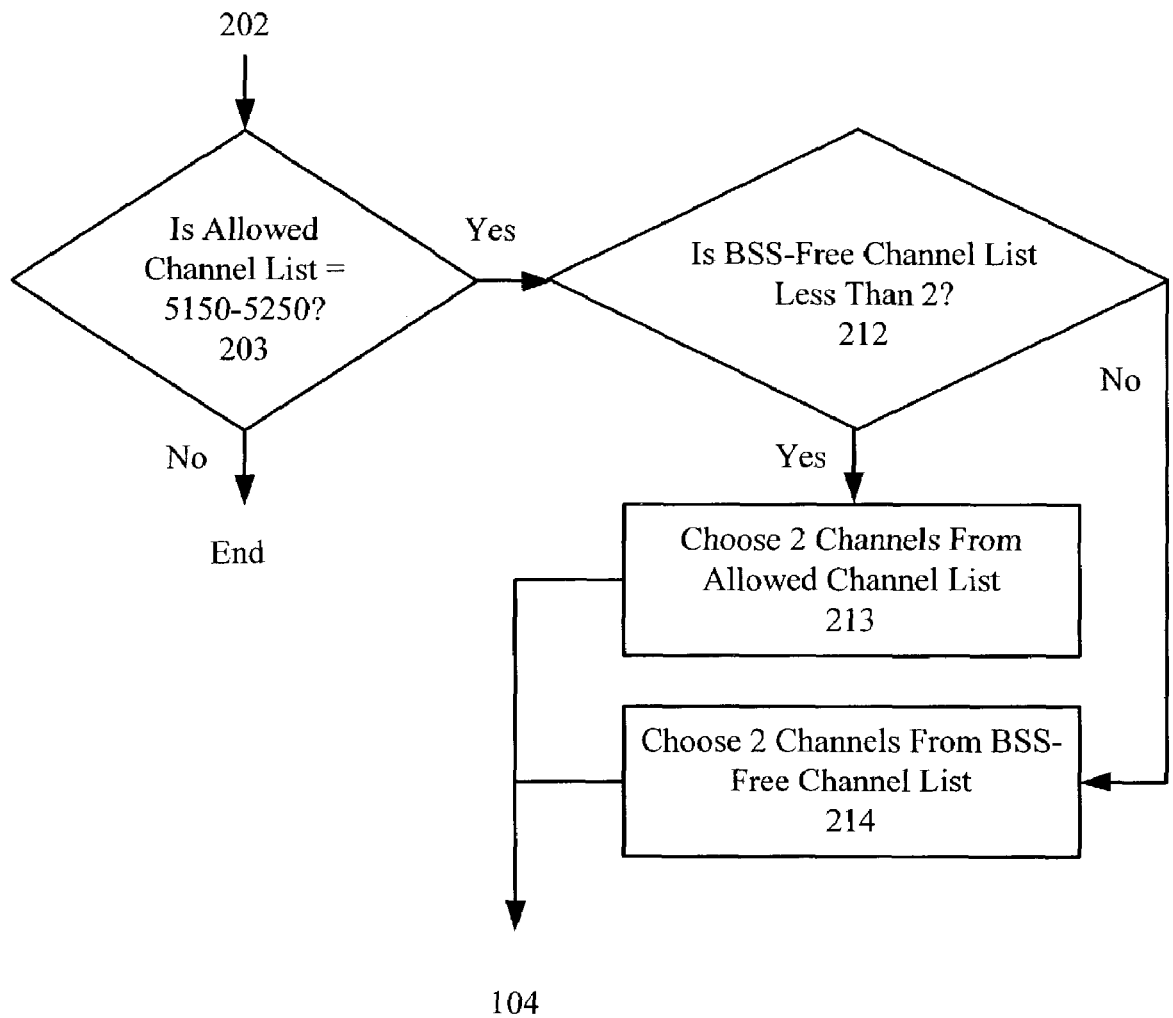

FIGS. 2A, 2B, and 2C illustrate an exemplary weighted process for populating a radar-free channel list. In one embodiment, the access point can populate the radar-free channel list using the allowed channel list and the BSS-free channel list. Preferably, two or three channels weighted toward the lower end of the spectrum can be chosen, thereby significantly improving legacy device support.

In step 201, if the allowed channel list includes channels having frequencies between 5150-5250 MHz, 5250-5350 MHz, as well as 5470-5725 MHz, then the access point determines whether the BSS-free channel list has less than two channels in step 204. In other words, if two or more channels currently have no (or an acceptable level of) transmission from other Basic Service Sets, then those channels would preferably be used for backup channels in case radar is detected on the current channel. If the BSS-free channel list does not have less than two channels, i.e. two or more channels are found in the BSS-free channel list, then the process can determine whether the BSS-free channel list includes at least one channel in each of the 5150-5250 MHz, 5250-5350 MHz, and 5470-5725 MHz sub-bands in step 206. If the BSS-free channel list includes at least one channel in each of the 5150-5250 MHz, 5250-5350 MHz, and 5470-5725 MHz sub-bands, then the access point can pseudo-randomly choose three channels from the BSS-free channel list in step 207. In one embodiment, one channel can be chosen from each of 5150-5250 MHz, 5250-5350 MHz, and 5470-5725 MHz (hence, the selection is deemed to be "pseudo-random").

On the other hand, if the BSS-free channel list has less than two channels or if the BSS-free channel list does not include at least one channel in each of the 5150-5250 MHz, 5250-5350 MHz, and 5470-5725 MHz sub-bands, then the access point can pseudo-randomly choose three channels from the allowed channel list in step 207. In one embodiment, one channel can be selected from each sub-band, i.e. 5150-5250 MHz, 5250-5350 MHz, and 5470-5725 MHz.

In step 202, if the allowed channel list includes channels having frequencies only between 5150-5250 MHz and 5250-5350 MHz, then the access point determines whether the BSS-free channel list has less than two channels in step 208. If not, then the process can determine whether the BSS-free channel list includes at least two channels in the 5150-5250 MHz sub-band and at least one channel in the 5250-5350 MHz sub-band in step 210. If the BSS-free channel list includes at least two channels in the 5150-5250 MHz sub-band and at least one channel in the 5250-5350 MHz sub-band, then the access point can pseudo-randomly choose three channels from the BSS-free channel list in step 211. In one embodiment, two channels can be chosen from the 5150-5250 MHz sub-band and one channel can be chosen from the 5250-5350 MHz sub-band.

On the other hand, if the BSS-free channel list has less than two channels or the BSS-free channel list does not contain at least two channels in the 5150-5250 MHz sub-band and one channel in the 5250-5350 MHz sub-band, then the access point can pseudo-randomly choose three channels from the allowed channel list in step 209. In one embodiment, two channels can be selected from the frequency range 5150-5250 MHz and one channel can be selected from the frequency range 5250-5350 MHz.

In step 203, if the allowed channel list includes channels having frequencies only between 5150-5250 MHz, then the access point determines whether the BSS-free channel list has less than two channels in step 212. If not, then the access point can randomly choose two channels from the BSS-free channel list in step 214. On the other hand, if the BSS-free channel list has less than two channels, then the access point can randomly choose two channels from the allowed channel list in step 213. In the case of the allowed channel list including frequencies only between 5150-5250 MHz, the choice of only two channels (steps 211/212) is adequate and desirable due to the less likely presence of radar signals in this sub-band. Moreover, reducing the number of channels in the radar-free channel list from three to two channels can advantageously reduce startup times while maintaining the required channel spreading.

In one embodiment where channels must be chosen from the allowed channel list due to the shortage of channels in the BSS-free channel list, the above steps can be modified to consider relative level of BSS activity on the occupied channels. In this embodiment, the access point can build a histogram of received signal strength (RSSI) levels and traffic levels from BSS signals received in each allowed channel. Those channels with combined RSSI & traffic levels constituting the lowest values can populate the BSS-free channel list. In this manner, the BSS-free channel list can still be used to populate the radar-free channel list even in the cases where some BSS traffic is present on most or all allowed channels. This process advantageously reduces the likelihood of the access point operating on a channel with heavy co-channel BSS traffic. In another embodiment, a single absolute RSSI threshold value can be used instead of a histogram of values.

Thus, allowed channels found to contain minimal and/or acceptable levels of BSS traffic can populate the BSS-free channel list. In other words, BSS traffic below a minimal RSSI value will have no real impact on the operation of the access point and therefore can safely be ignored.

Radar Scan Performed by an Access Point Under Normal Operation

Figure 3A:
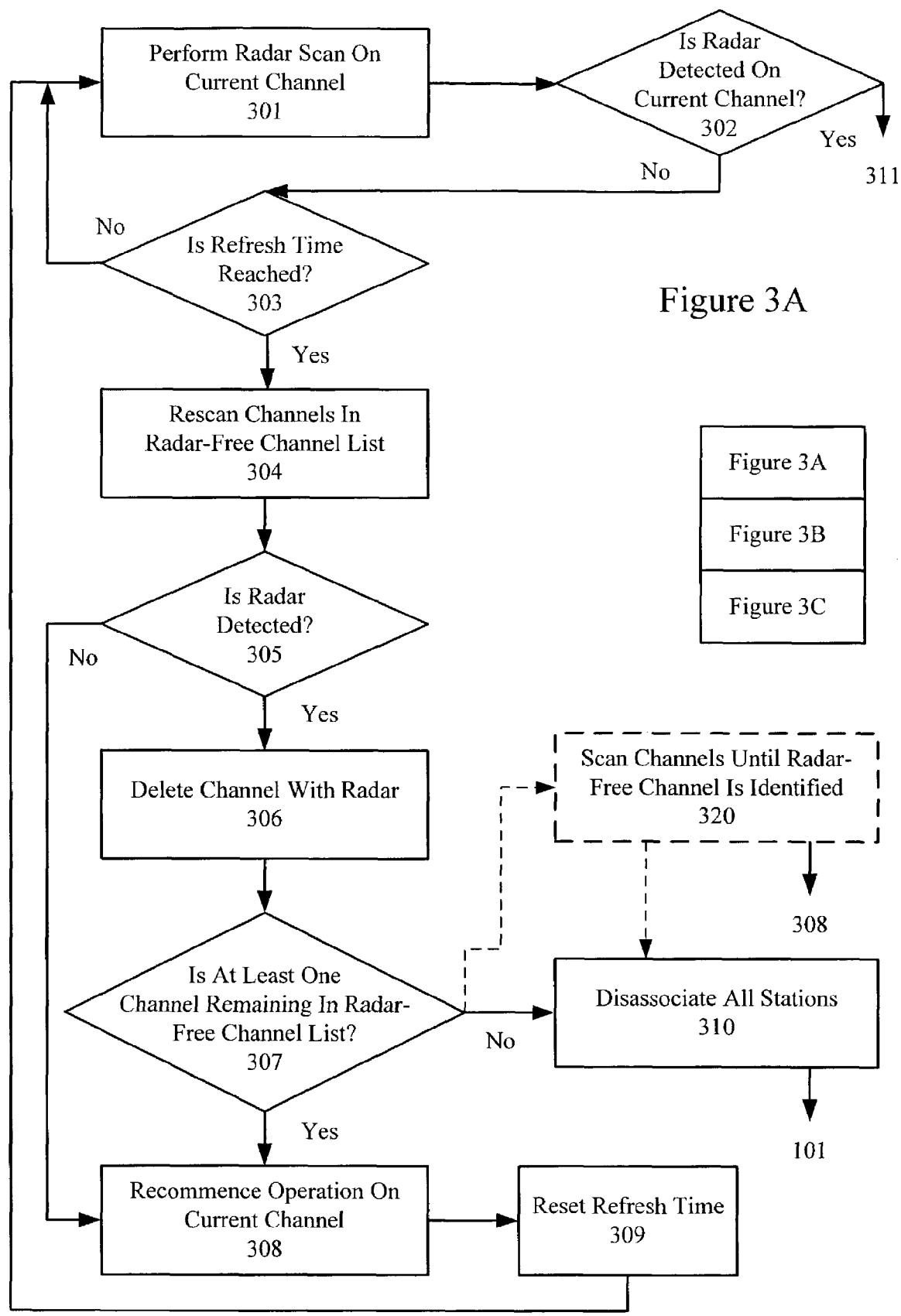
FIG. 3A illustrates an exemplary radar scan process that can be performed by an access point during normal operation.
Figure 3B:
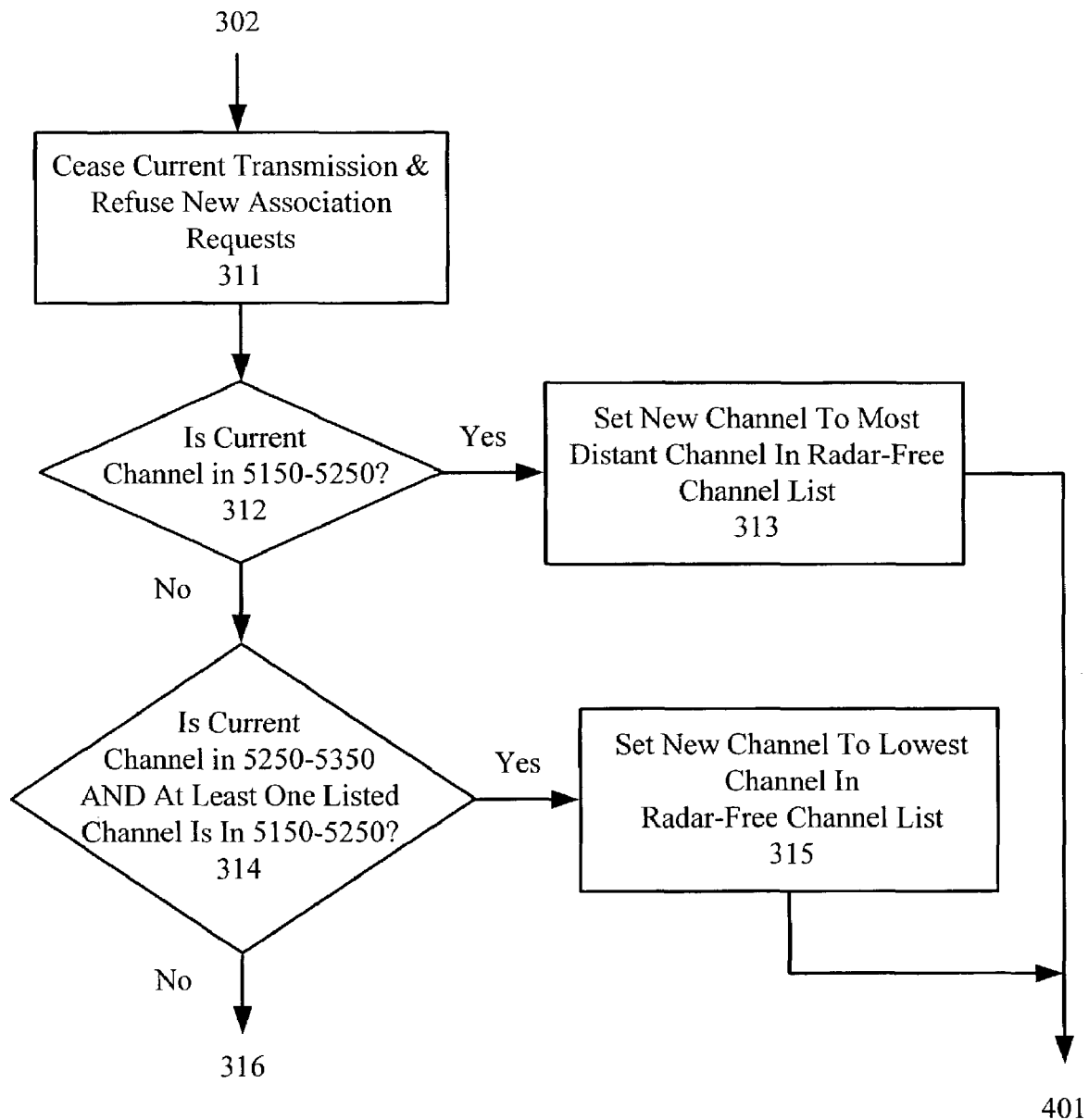
FIGS. 3B and 3C illustrate one embodiment of a channel switch process that can be performed by an access point during normal operation.
Figure 3C:
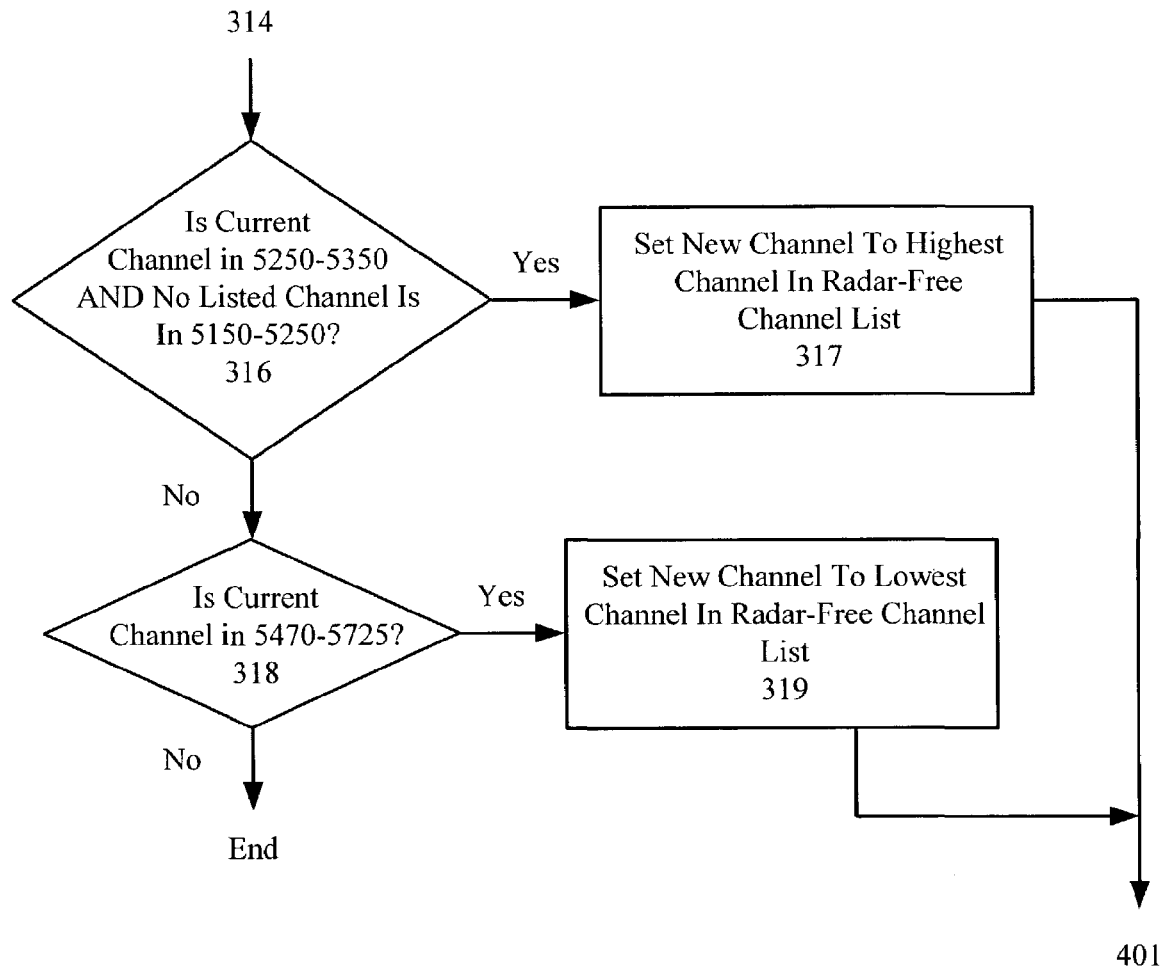

FIGS. 3A-3C illustrate one embodiment of a radar scan that can be performed by an access point during normal operation. In accordance with one aspect of the invention, ongoing radar scanning of the current channel is required. This scanning is performed during normal operation on the current channel per step 301 to ensure compliance with regulatory requirements. If radar is detected on the current channel, as determined in step 302, then the process proceeds to step 311, which is explained in reference to FIG. 3B.

If radar is not detected on the current channel, then the access point determines whether a refresh time has been reached in step 303. The refresh time refers to a time period during which the backup channels in the radar-free channel list should be re-checked for radar. Specifically, some regulatory specifications require that a WLAN device rescan any channel in the radar-free channel list, otherwise the access point cannot change to that backup channel during a channel switch operation. A 24-hour period is typical for this refresh period. Per European requirements, the access point must perform another 60 sec scan for radar on each backup channel during the refresh period. If the refresh time is not reached in step 303, then the access point returns to step 301 and continues to perform a periodic radar scan on the current channel. If the refresh time is reached, then the access point pauses normal operation and rescans the backup channels in the radar-free channel list in step 304.

Refresh scanning is preferably performed at set times rather than attempting to refresh at the unpredictable time of a channel switch due to radar detection in the current channel. Specifically, sending a channel switch announcement and ceasing operation on a channel can be performed in a much shorter timeframe than the 60 seconds required to perform a scan of each backup channel. Therefore, to save time during channel switching and reduce disruption of the network, refresh scanning should be done during normal operation. However, interrupting operation of the wireless network (even if scheduled for after hours) for a 60 second refresh operation on even one of the backup channels could result in all stations losing communication with higher layer protocols and applications as well as possible loss of data or other unacceptable interruptions.

Therefore, one exemplary refresh operation includes the access point using short (e.g. 2-5 sec) periodic scanning of each backup channel to meet the 60 second aggregate scan time, thereby meeting regulatory requirements while minimizing user and network impact. In another embodiment, one or more associated stations can be used to perform short periodic scanning of each backup channel (see, for example, FIG. 6B). In accordance with one feature of the invention, identifying a short backup list with 1 or 2 channels can advantageously ensure that refreshing of the backup channels can be done significantly faster compared to refreshing a larger list. Furthermore, using the short periodic refresh scan can dramatically reduce or even eliminate disruption of network operation.

If radar is detected on one or more backup channels during refresh scanning per step 305, then any channel with radar is deleted from the radar-free channel list in step 306 and completion of the full aggregate scan is abandoned for those channels immediately upon detection of radar. In another embodiment, the access point can attempt a revalidation of a deleted channel at a predetermined interval (e.g. 30 min). If radar is not found during revalidation, then that channel can be added back to the radar-free channel list. If at least one backup channel remains in the radar-free channel list (as determined in step 307) or if radar is not detected in step 305, then the access point can recommence its normal operation on the current channel in step 308 and reset the refresh time in step 309. At this point, the access point can return to step 301 to scan for radar on the current channel.

If no channels remain in the radar-free channel list (step 307), then the access point can disassociate with all stations in step 310. At this point, the access point can return to step 101 for a startup (or restart) scan. In another embodiment, the access point can perform background scanning (e.g. periodic scanning in 200 ms increments) of any allowed channels in step 320 until one radar-free channel is identified and added to the radar-free channel list. Then, the process can proceed to step 308. In one embodiment, if a radar-free channel cannot be found, then the process could proceed to step 310, i.e. disassociation of all stations.

FIGS. 3B and 3C illustrate an exemplary channel switch process for an access point if radar is detected in the current channel. In step 311 of this process, the access point ceases current transmission on that channel and refuses new association requests. At this point, the access point can characterize the current channel according to sub-band (e.g. 5150-5250 MHz, 5250-5350 MHz, and 5470-5725 MHz) and respond based on this characterization.

Because radars at close range can cause a WLAN to receive significant energy on multiple channels adjacent to the current channel, setting a new channel as far in frequency as possible from the current channel advantageously reduces the probability of the new channel having radar. For example, if the current channel is in the sub-band of 5150 MHz and 5250 MHz, as determined in step 312, then the access point-can advantageously set its new channel to the most distant channel in the radar-free channel list in step 313. In one embodiment, when two channels in the radar-free channel list are equally distant from the current channel, then the access point can choose the lower of the two channels, thereby increasing the likelihood that a legacy station can operate on that channel. If the current channel is in the sub-band of 5250-5350 MHz and at least one channel in radar-free channel list is in the sub-band of 5150-5250 MHz, as determined in step 314, then the access point can set its new channel to the lowest channel in the radar-free channel list in step 315. In contrast, if the current channel is in the sub-band of 5250-5350 MHz and no channel in the radar-free channel list is in the sub-band of 5150-5250 MHz, as determined in step 316, then the access point can set its new channel to the highest channel in the radar-free channel list in step 317. Finally, if the current channel is in the sub-band of 5470-5725 MHz, as determined in step 318, then the access point can set its new channel to the lowest channel in the radar-free channel list in step 319. After setting its new channel, the access point can proceed to a channel change routine described in reference to FIG. 4.

Access Point Operation During Channel Change

After detecting radar, the access point may transmit control and/or management frames up to a maximum move time (MaxMoveTime) (e.g. 10.24 sec) as provided by current regulations. However, to reduce impact to latency-sensitive applications, the access point should perform the channel change as quickly as possible (that is, on the order of less than 3 sec).

Figure 4:
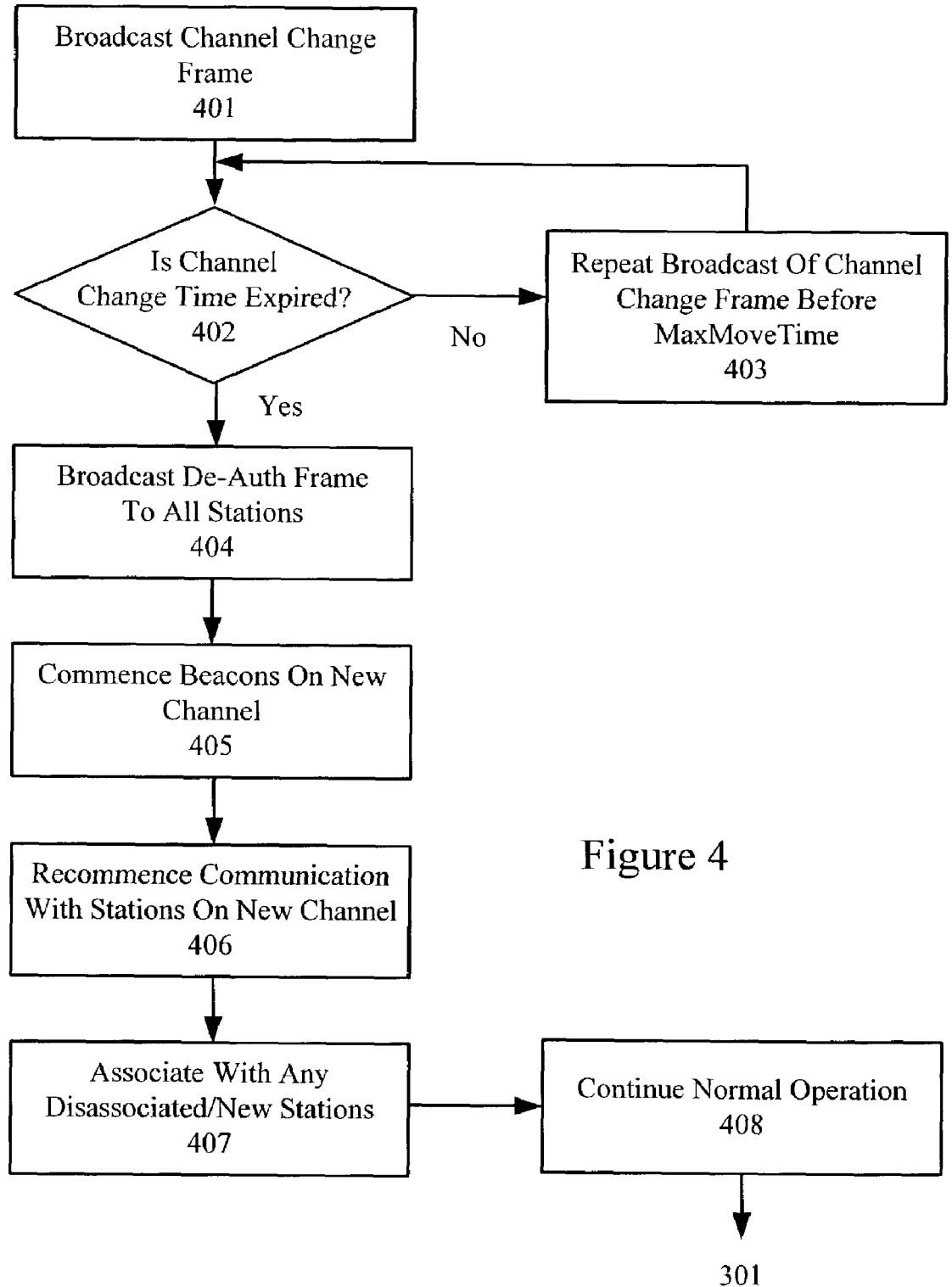
FIG. 4 illustrates an exemplary channel change process that can be performed by an access point. In this channel change process, the access point can remain associated with 802.11h compliant stations, but quickly disassociate with non-802.11h compliant stations.

Therefore, in accordance with one aspect of the invention shown in FIG. 4, the access point can quickly disassociate with non-802.11h compliant stations because they are not capable of acting on a channel change frame broadcast by the access point. The access point can advantageously maintain association with most 802.11h compliant stations on a new channel via a channel change procedure described in reference to steps 401-408. Specifically, in step 401, the access point can broadcast a channel change frame to its associated stations. Of importance, the 802.11h compliant stations, upon receiving the channel change frame should respond by ceasing normal data transmissions and changing their transmitting channel to the new channel at the channel switch time designated in the channel change frame. However, some 802.11h compliant stations could be sleeping or otherwise miss the channel change frame (e.g. due to interference from ongoing co-channel radar pulses or system malfunction).

In step 402, the access point determines whether a channel change time is expired. If the channel change time is not expired, then the access point can repeat the broadcast of the channel change frame in step 403 up to the MaxMoveTime, but typically for a duration less than 3 seconds. If the channel change time is expired, then the access point can broadcast a de-authenticate frame to any remaining stations on the old channel in step 404. The broadcasted de-authenticate frame, which silences all stations and results in disassociation with the access point, is sent only after the expiration of a channel switch time. This timing prevents 802.11h compliant stations from receiving the de-authenticate frame (which would otherwise result in such stations immediately disconnecting from the access point rather than perform the less disruptive channel change procedure). Note that any resulting disassociation does not contradict the IEEE 802.11h standard or regulatory requirements. Advantageously, upon losing contact with the access point, a station is programmed to cease data transmission within 1 second, thereby causing limited, if any, impact to any radar systems. Note that these disassociated stations can quickly re-associate with the access point (discussed in reference to step 407) on the new channel or associate with a new access point on yet another channel.

In step 405, the access point moves to the new channel and commences sending beacons on this new channel. In step 406, the access point can recommence communication with 802.11h compliant stations that successfully moved to the new channel. In step 407, the access point can associate with any stations that became disassociated during the channel switch and/or with any new stations requesting association. The access point can continue with its normal operation in step 408, which includes scanning for radar (step 301).

DFS Implementation for a WLAN Station

Figure 5:
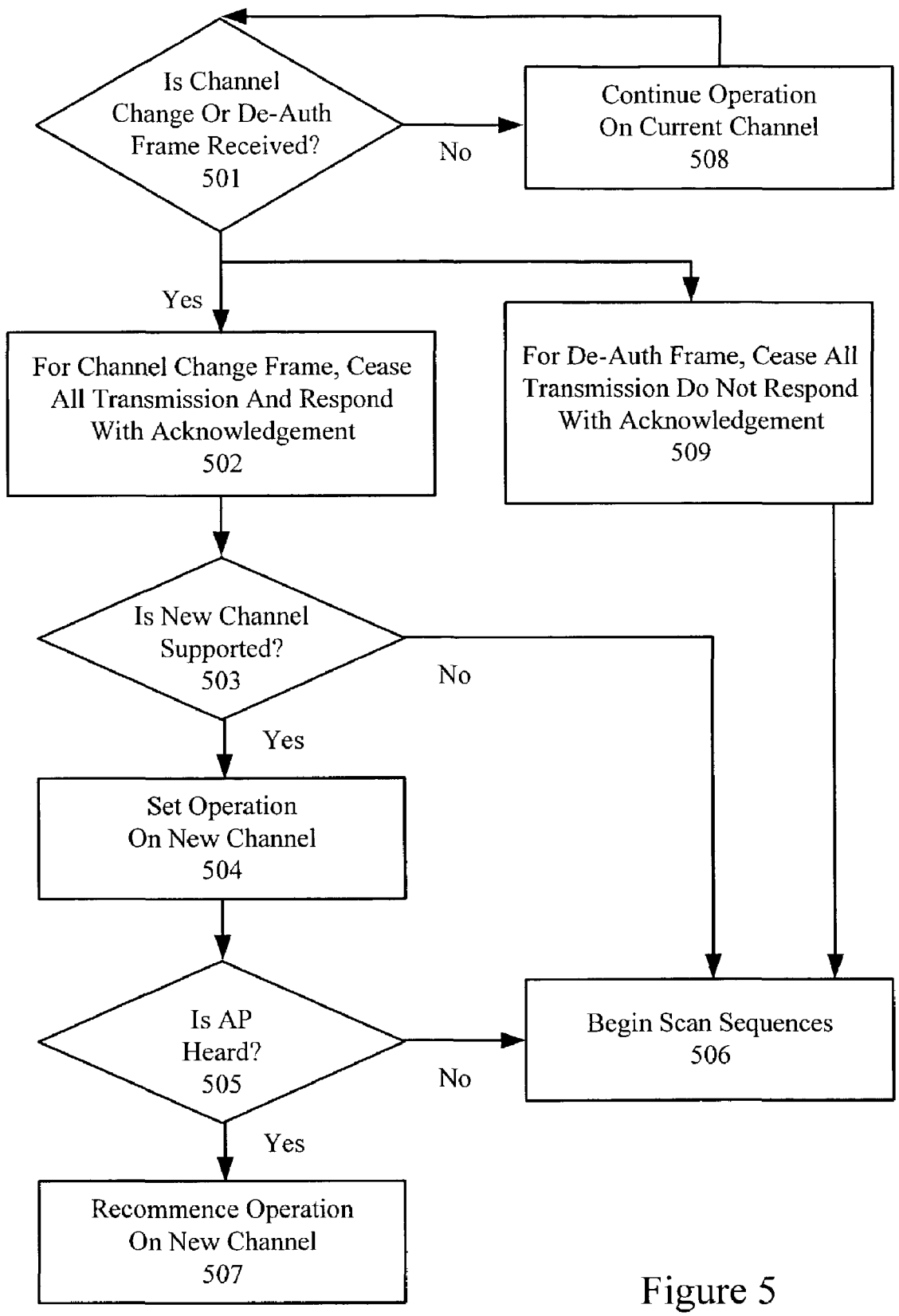
FIG. 5 illustrates one embodiment of a channel change process in a station. This channel change process allows the station to remain compliant with the IEEE 802.11h standard, remain compatible with non-802.11h access points, and conform to mandatory European requirements.

FIG. 5 illustrates an exemplary channel change process that can be performed in a WLAN station. This channel change process advantageously allows the station to remain compliant with the IEEE 802.11h standard, remain compatible with non-802.11h access points, and yet conform to mandatory European requirements.

In step 501, the station determines whether it has received a channel change or de-authenticate frame from an access point. If a channel change frame is received, then the station ceases all transmission and responds with an acknowledgement in step 502. If the station supports the new channel, as determined in step 503, then the station sets its operation for the new channel in step 504. In one embodiment, re-authentication of the station is not necessary in step 504.

At this point, the station is ready to hear signals (i.e. beacons) from the access point on the new channel. In one embodiment, the appropriate time to wait to hear the access point in step 505 includes the time necessary for an access point to change channels plus the time for a predetermined number of beacons (e.g. seven beacons) to be sent by that access point. Note that various timers within the station can be frozen during this channel change either using this or different timing.

If the station hears the access point on the new channel in step 505, then the station can recommence operation on the new channel in step 507. On the other hand, if the station does not hear the access point on the new channel, then the station can begin a normal passive scan sequence on all allowed channels in step 506. If the station receives a de-authenticate frame from an access point, then the station immediately ceases all transmission in step 509. This cessation is generally not preceded with an acknowledgement by the station to the access point. Note that the de-authenticate frame may be transmitted when a non-802.11h access point (i.e. a legacy access point) responds to radar detection or when the station has missed a channel change frame from an 802.11h access point (recall that the access point sends a de-authenticate frame before leaving the channel). Once the de-authenticate frame is received, the station can begin scan sequences on the allowed channels in step 506.

The station may also be configured with a relatively short missed beacon timer (e.g. 1 second beacon interval×2 missed beacons) to further protect radars in the situation where the station receives neither a de-authenticate frame nor a channel change frame. In this case, within 2 seconds after the access point vacates the current channel due to a radar event, the station would cease all transmission. Shorter values for the missed beacon timer may result in degraded station performance with marginal links to the access point.

Note that if the station is not capable of detecting radar, the station can be configured to disable adhoc communication using any 5 GHz channel and to force a passive scan in step 506. This configuration ensures that the station will not transmit on any 5 GHz channel until after an access point has checked for radars and commences sending beacons. Specifically, regulatory requirements allow stations not capable of detecting radar to remain under control of a 'Master' device, e.g. an access point, which is responsible for checking for radars before and during use of any channel. The embodiment described in FIG. 5 allows station devices with no radar detection feature to comply with regulatory requirements while maintaining providing efficient startup and ongoing operation when operating in regions in which DFS is required. On the other hand, if the station is capable of detecting radar, then the station can be configured to enable adhoc communication and to perform an active scan in step 506, although such a station is not required to do either. Thus, even stations capable of detecting radar could be configured to perform a passive scan in step 506.

Stations Assist in Radar Detection Function

Figure 6A:
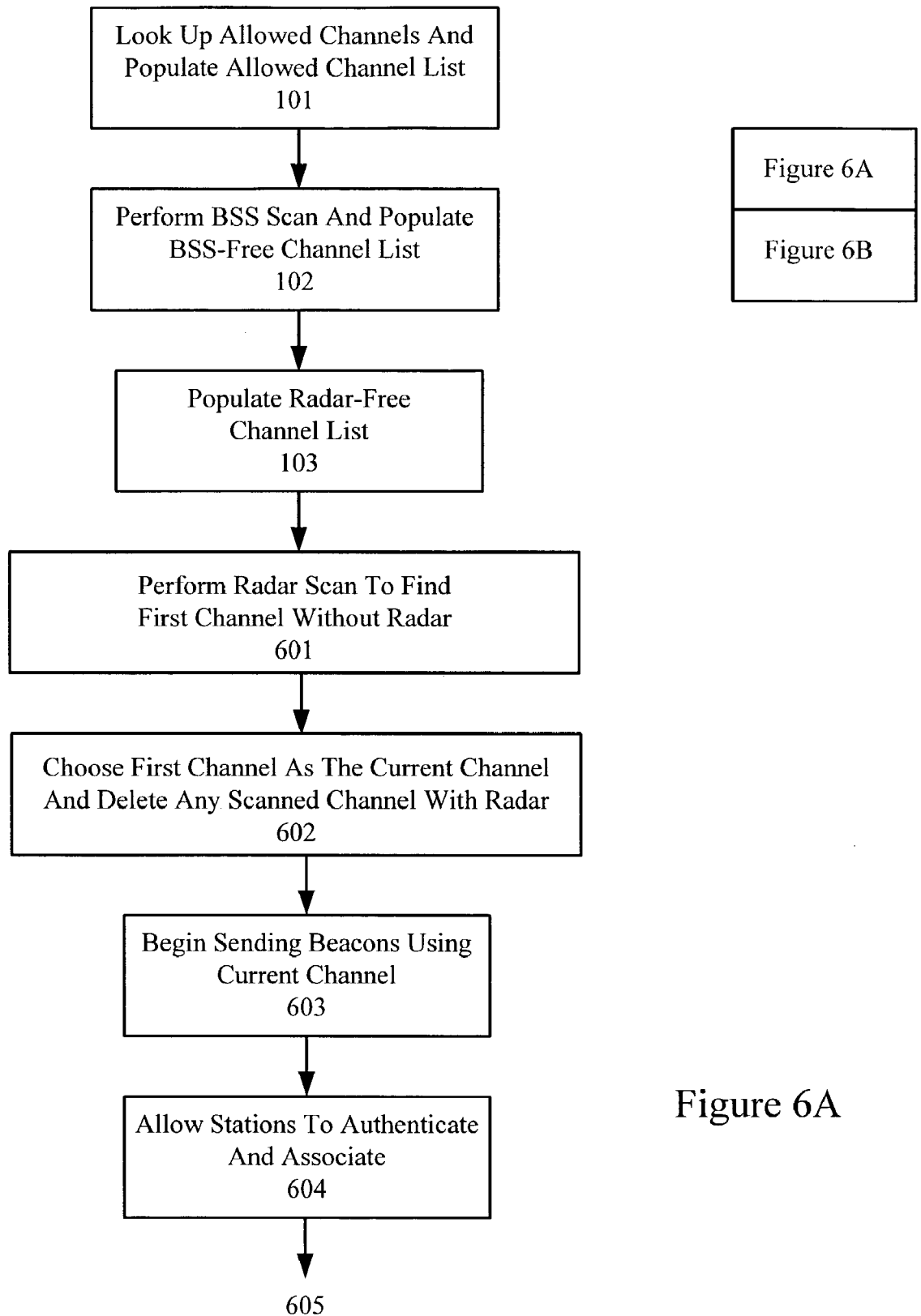
FIGS. 6A and 6B illustrate another exemplary startup operation in which an access point can request associated stations to assist in the radar detection function.
Figure 6B:
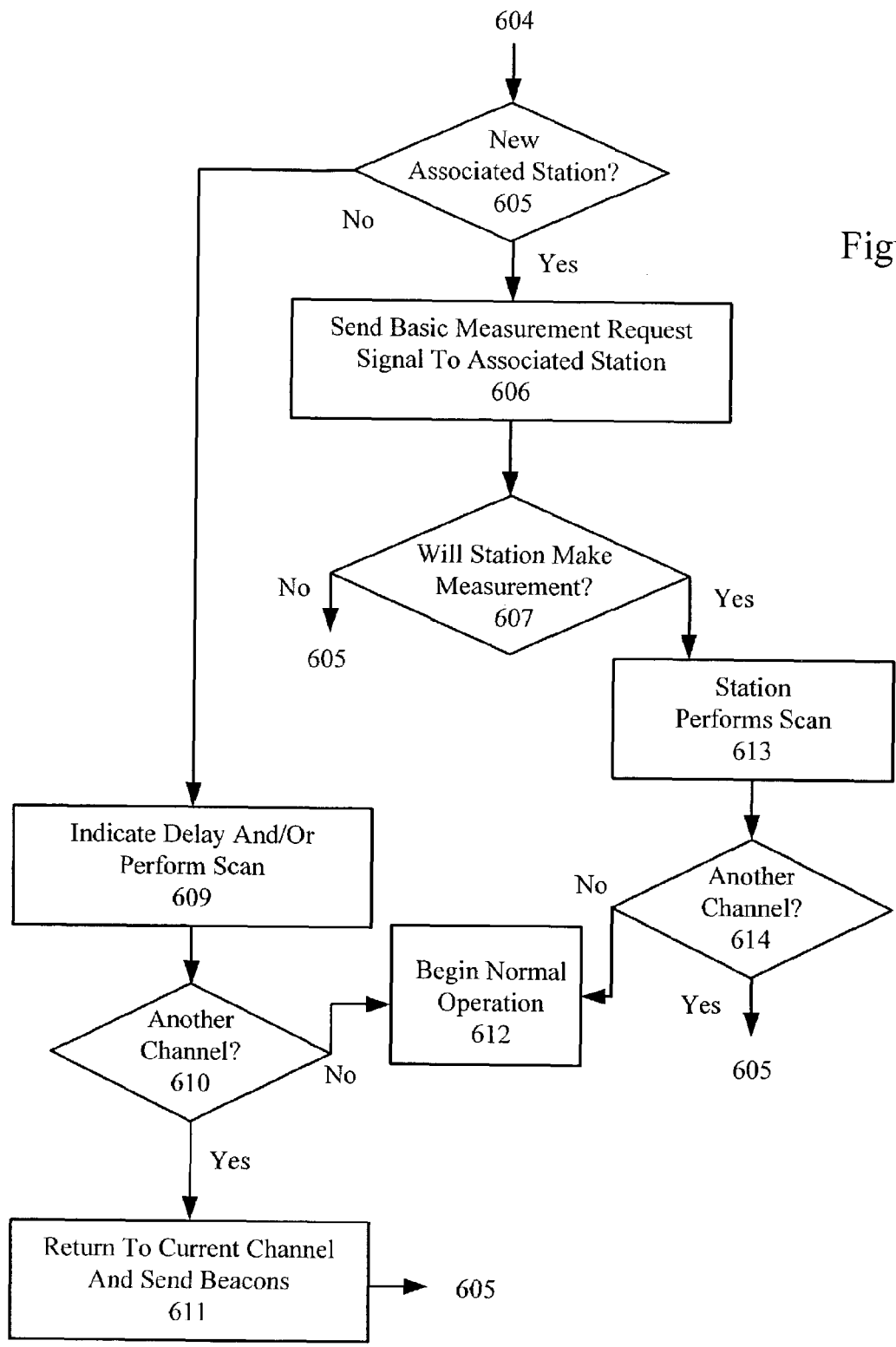

In one embodiment, the access point can further reduce startup time by enlisting the help of one or more associated stations that are capable of performing the radar detection function. FIGS. 6A and 6B illustrates an exemplary startup operation in which stations can assist the access point in the radar detection function. In one embodiment, the access point can use steps 101-103, as described in reference to FIG. 1, for populating the radar-free channel list.

Then, in step 601, the access point can perform a 60 second radar scan on a randomly selected channel in the radar-free channel list. This scanning can continue until the access point finds a first channel without radar. Any scanned channels including radar can be deleted from the radar-free channel list. In step 602, the access point can choose the first radar-free channel as the current channel, remove this channel from the radar-free channel list, and begin sending beacons on that channel in step 603. Note that because the backup channels are not yet selected, the startup time can be significantly reduced compared with the process described in reference to FIG. 1.

Next, in step 604, the access point can allow stations to authenticate and associate. If at least one new station has associated with the access point, as determined in step 605, then, before sending or receiving data frames, the access point can immediately send a Basic Measurement Request frame to an associated station in step 606. In one embodiment, the access point can send the frame to the station that first requested association. This signal requests the station to scan a candidate channel in the radar-free channel list for radar. The access point can request that the scan be limited to a short duration (e.g. 2-5 sec). In one embodiment, the access point can identify a channel for the station to scan. For example, the channel identification process can include steps substantially similar to steps 312-319 (that is, instead of setting the backup channel to the current channel, the candidate channel would be scanned for radar).

However, the station may be incapable or unwilling to accept and perform the measurement request on the designated channel, as determined in step 607. If the station responds that it will not make the radar measurement (e.g. refuses, is incapable, or does not respond to the request at all), then the access point can determine if there is another newly associated station in step 605. If so, then the process continues with step 606. If there is not another newly associated station that will make the measurement, then the access point will indicate to any associated station(s) that communication will be delayed for a predetermined period of time while the access point itself switches to the alternate channel and performs a short scan for radar in step 609.

To minimize latency and interruption of data processing during normal operation in step 609, particularly when many stations may require access to the network, the duration of the access point scan can be short enough to ensure continued network operation, e.g. 100 to 200 ms. In one embodiment, the stations can be informed to cease transmission for this period (plus a short buffer time for the access point to switch out of and back to the current channel of operation) using a point coordination function (PCF) of the access point in combination with an appropriate Contention Free Period value, which results in a long NAV value in the station. Note that the PCF, which is provided by the IEEE 802.11 standard, allows an access point to control the timing of transmissions from its associated stations. Specifically, by using the PCF, the access point broadcasts that it will poll each station and the station can only respond after being polled. The NAV value indicates the minimum time that a station must wait until trying to communicate with the access point again. After scanning, the access point can return to the current channel of operation, reset the NAV and PCF and continue to listen for radar on the current channel. After approximately the same period of time used for scanning, e.g. 100 to 200 ms, the access point can repeat its scan on that backup channel. Assuming a scan/rest time of 200 ms, the access point would repeat the process 300 times to meet an exemplary regulatory requirement of a 60 sec scan for a backup channel.

If the candidate backup channel is radar-free, then the access point can set the refresh time for that backup channel. On the other hand, if the candidate backup channel has radar, then the access point can delete that channel from the radar-free channel list. Note that if the access point detects radar on the current channel before any backup channels in the radar-free channel list have been identified from the candidate backup channels, then the access point typically restarts (i.e. returns to step 101, in either FIG. 1 or FIG. 6A).

In step 610, the access point can determine whether another candidate backup channel from the radar-free channel list should be scanned (i.e. if the number of radar-free backup channels is less than a predetermined number, such as 2). If not, then normal WLAN operation can begin in step 612. If so, then the access point can return to the current channel, send beacons, and listen for any additional stations requesting association in step 611. The process then returns to step 605.

Note that this process could be followed even if no stations attempt to associate after startup. In such a case, after determining that no associated channels are available in step 605, the access point could proceed directly to step 609 to alternately perform short checks for radar on a different channel and send beacons on the current channel of operation until a full scan has been performed.

Referring back to step 607, if the newly associated station responds that it will make the radar measurement, then that station proceeds to make the radar measurement in step 613. Note that if the station detects radar, the access point can delete that channel from the radar-free channel list and another un-scanned candidate backup channel from that list can be used in the next scan. In step 614, the access point can determine whether another backup channel is needed. If not, then normal operation can begin in step 612. If so, then the access point can determine whether another newly associated station is available in step 605. The steps described in reference to FIG. 6B can be repeated until full scanning has occurred for each backup channel.

Assuming that multiple associated stations are available and can make the radar measurement, the scanning of the desired number of backup channels in the radar-free channel list can be performed quickly. For example, the access point can request one associated station to scan one channel and also request another station to scan another channel. Thus, assuming a full scan takes 60 sec, if two stations capable of making measurements associate with the access point immediately upon commencement of access point operation on the initial channel, then the desired two backup channels can be found and added to the radar-free channel list in 60-120 seconds. Note that if two scans are being performed substantially in parallel and only one additional backup channel is needed, then the first channel found to be without radar will be designated the backup channel (wherein the access point could then immediately stop scanning of the second channel).

Advantageously, by requesting the stations to perform the radar scans, startup of the WLAN network can begin a number of minutes faster compared to the access point itself scanning 3 or more channels during startup. Note that a station is allowed to associate after only one channel is found to be radar-free, thereby ensuring that communication between the access point and that station can begin immediately upon completion of its scan period, if applicable. Moreover, because an associated station is not allowed to begin transmitting or receiving data until the station indicates it will not make the measurement, has performed a full scan of one channel on the radar-free channel list, or the desired number of backup channels is provided, the associated station will not begin any applications that may be interrupted.

In one embodiment of step 613, the access point can repeatedly request a station to perform short (e.g. 2-5 sec) scans on one backup channel (using the Basic Measurement Request) until these short scans cumulatively meet the regulatory requirements for radar scan (e.g. 60 sec on each backup channel). Thus, during normal operation and assuming the predetermined number of desired backup channels has not been scanned, the access point can continue to request that each newly associated station perform a short scan on one of the not yet scanned candidate channels listed in the radar-free channel list. Of importance, by enlisting the help of any newly associated stations to perform the radar scan function, the startup delay for any new station is limited to the required cumulative scan time (e.g. 60 sec). In one embodiment, the access point will not make this request if the station is re-associating with the access point, thereby avoiding disrupting receipt of data that may be queued or otherwise disrupting any latency-sensitive application currently running on the station.

OTHER EMBODIMENTS

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

For example, the scan times associated with the access point and the stations are illustrative only and not limiting. Other embodiments of the invention can include different, i.e. longer or shorter, scan times depending on device, system, and/or political considerations. Specifically, although DFS has been described in detail in reference to European regulations, other countries may soon promulgate rules regarding DFS. For example, certain organizations, such as the International Telecommunications Union (which currently includes 144 member countries worldwide) are working on a global allocation to harmonize the 5 GHz spectrum. As part of that harmonization, many regional domains around the world may adopt rules that make DFS a requirement, although not all regional domains may specify the same implementation details.

In one embodiment of the invention, instead of being limited to assisting in the radar scan of one channel (see FIG. 6B), station devices could be periodically requested to scan for radar in multiple channels. For example, an access point could implement certain other defined scanning periods and sequences. During these defined scanning periods, a series of capable stations could search for radar in multiple channels in parallel, thereby significantly improving access point performance In another embodiment of the invention, instead of providing one refresh time for all backup channels, each backup channel can have its own refresh time.

Figure 7:
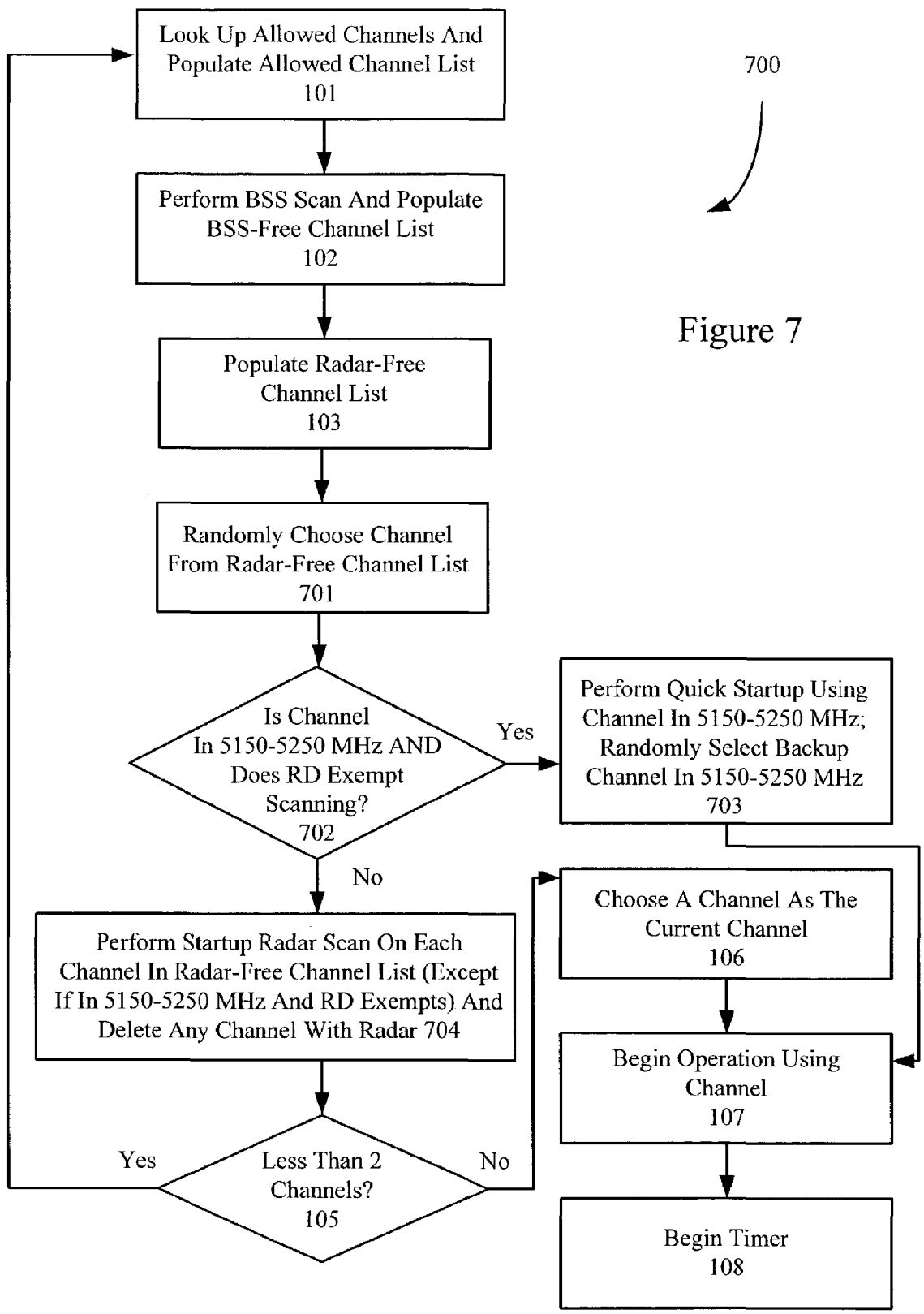
FIG. 7 illustrates another exemplary process for channel selection during startup/restart of an access point.

In yet another embodiment shown in FIG. 7, a startup process 700 can take into account whether a regulatory domain exempts WLAN devices from detecting radars in the 5150-5250 MHz sub-band. If exempted, the WLAN devices can use a fast startup procedure that still meets mandated spreading requirements. In one embodiment, process 700, after being called by a main routine, can perform steps 101-103 (described in reference to FIG. 1).

In step 701, a channel can be randomly selected from the radar-free channel list. Note that this random selection is required to maintain compliance with spreading rules (i.e. to prevent WLAN devices from choosing channels in 5150-5250 MHz for startup each time). If the selected channel is in the 5150-5250 MHz sub-band and the regulatory domain exempts scanning for channels in this sub-band, then a quick start routine can be performed in step 703. In this quick start routine, process 700 can advantageously bypass all startup radar scanning (normally lasting 60 seconds or longer). Of importance, this bypass is acceptable because a regulatory domain that exempts scanning in the 5150-5250 MHz sub-band does not allow radar in this sub-band. Therefore, if the selected channel is in the 5150-5250 MHz sub-band, then the selected channel has a high enough probability of not having radar that the selected channel can be designated the current channel of operation.

In one embodiment, a backup channel can also be randomly selected from the 5150-5250 MHz sub-band in step 703. Advantageously, because the backup channel also resides in 5150-5250 MHz sub-band, the need for a radar scan (normally lasting 60 seconds or longer) for selecting the backup channel can also be eliminated. Note that selection of the backup channel from the 5150-5250 MHz sub-band (rather than a random choice from among all available channels) does not contradict the spreading rules because the use of this backup channel is not likely to occur in practice.

In other words, assuming normal operation, the backup channel will not be called because radar would typically not be detected in the current channel. Thus, the selection of the backup channel can be performed in step 703 to account for the rare event that radar, although prohibited in this sub-band, is detected in the current channel. After selection of the backup channel, normal operation on the current channel may commence in step 107.

If the current channel is not the 5150-5250 MHz sub-band or if the regulatory domain does not exempt scanning in this sub-band, then a startup radar scan can be performed on each channel in the radar-free channel list in step 704. Note that if the regulatory domain does exempt scanning, then any scanning of channels in the radar-free channel list in the 5150-5250 MHz sub-band can be skipped. Steps 105-108 can then be performed as described in reference to FIG. 1.

Accordingly, it is intended that the scope of the invention be defined by the following Claims and their equivalents.

The invention claimed is:

1. A method of populating a backup channel list for a wireless local area network (WLAN) device operable in a spectrum, the method comprising:

designating a plurality of allowed sub-bands in a predetermined frequency band and populating an allowed channel list with channels of the allowed sub-bands;

performing a basic service set (BSS) scan of the channels of the allowed channel list and populating a BSS-free channel list with channels determined to have a minimal level of current transmission thereon;

when less than two channels are in the BSS-free channel list, selecting at least two channels in the allowed channel list, one channel from each allowed sub-band;

when at least two channels are in the BSS-free channel list, selecting at least two channels in the BSS-free channel list, one channel from each allowed sub-band; and populating the backup channel list with any selected channels.

2. A method of populating a radar-free channel list for a wireless local area network (WLAN) device operable in a 5 GHz spectrum, the spectrum being divided into a first sub-band of 5150-5250 MHz, a second sub-band of 5250-5350 MHz, and a third sub-band of 5470-5725 MHz, the method comprising:

populating an allowed channel list with channels allowed by a regulatory domain for that spectrum;

populating a BSS-free channel list with the allowed channels having acceptable levels of current WLAN transmission thereon;

if the allowed channel list includes channels from the first, second, and third sub-bands, then determining whether the BSS-free channel list has less than two channels,
  if so, then choosing three channels from the allowed channel list, wherein a first channel is chosen from the first sub-band, a second channel is chosen from the second sub-band, and a third channel is chosen from the third sub-band,
  if not, then choosing three channels from the BSS-free channel list, wherein a first channel is chosen from the first sub-band, a second channel is chosen from the second sub-band, and a third channel is chosen from the third sub-band,;
if the allowed channel list includes channels from the first and second sub-bands, then determining whether the BSS-free channel list has less than two channels,
  if so, then choosing three channels from the allowed channel list, wherein a first channel is chosen from the first sub-band, a second channel is chosen from the first sub-band, and a third channel is chosen from the second sub-band,
  if not, then choosing three channels from the BSS-free channel list, wherein a first channel is chosen from the first sub-band, a second channel is chosen from the first sub-band, and a third channel is chosen from the second sub-band; and
if the allowed channel list includes channels from only the first sub-band, then determining whether the BSS-free channel list has less than two channels,
  if so, then choosing two channels from the allowed channel list in the first sub-band,
  if not, then choosing two channels from the BSS-free channel list in the first sub-band.

3. A method of populating a radar-free channel list for a wireless local area network (WLAN) device operable in a 5 GHz spectrum, the spectrum being divided into a first sub-band of 5150-5250 MHz, a second sub-band of 5250-5350 MHz, and a third sub-band of 5470-5725 MHz, the method comprising:
  populating an allowed channel list with channels allowed by a regulatory domain for that spectrum;
  populating a BSS-free channel list with the allowed channels having acceptable levels of current WLAN transmission thereon;
  if the allowed channel list includes channels from all the sub-bands, then determining whether the BSS-free channel list has less than two channels,
    if so, then choosing three channels from the allowed channel list,
    if not, then choosing three channels from the BSS-free channel list;
  if the allowed channel list includes channels from only two sub-bands, then determining whether the BSS-free channel list has less than two channels,
    if so, then choosing three channels from the allowed channel list,
    if not, then choosing three channels from the BSS-free channel list; and
  if the allowed channel list includes channels from only one sub-band, then determining whether the BSS-free channel list has less than two channels,
    if so, then choosing two channels from the allowed channel list,
    if not, then choosing two channels from the BSS-free channel list.

4. The method of claim 3, wherein if the allowed channel list includes channels from all sub-bands, then choosing the three channels includes a pseudo-random selection that increases a likelihood of choosing a channel unused by other basic service sets (BSSs) and free of radar signals.

5. The method of claim 3, wherein if the allowed channel list includes channels from all sub-bands, then choosing the three channels includes a pseudo-random selection that increases frequency spreading.

6. The method of claim 3, wherein if the allowed channel list includes channels from all sub-bands, then choosing three channels includes a pseudo-random selection that increases a likelihood of most stations associated with the access point being operable in the three channels.

7. The method of claim 3, wherein if the allowed channel list only includes channels from only two sub-bands, then of the three channels, two channels are selected from the first sub-band and one channel is selected from the second sub-band.

8. The method of claim 3, wherein if the allowed channel list includes channels from only two sub-bands, then using a weighting function to select more channels from the first sub-band than from the second sub-band.

9. The method of claim 3, wherein if the allowed channel list includes channels from only one sub-band, then randomly choosing two channels in the first sub-band.

10. A method of performing a startup operation for an access point in a regulatory domain, the regulatory domain having a frequency spreading requirement, the access point being allowed to communicate using allowed channels in a spectrum, the method comprising:
  (i) populating an allowed channel list with the allowed channels;
  (ii) populating a BSS-free channel list with allowed channels having acceptable levels of current WLAN transmission thereon;
  (iii) populating a radar-free channel list using the BSS-free channel list and the allowed channel list;
  (iv) performing a radar scan on each channel in the radar-free channel list;
  (v) deleting any channel with radar in the radar-free channel list;
  (vi) repeating steps (i)-(v) until a predetermined number of channels remain in the radar-free channel list;
  (vii) choosing a first channel in the radar-free channel list for operation; and
  (viii) beginning operation with the first channel.

11. The method of claim 10, wherein choosing a first channel includes deleting the first channel from the radar-free channel.

12. The method of claim 11, further including setting a time to re-scan any channels in the radar-free channel list.

13. The method of claim 10, wherein populating the radar-free channel list includes:
  weighting the channels based on actual and potential use of allowed sub-bands in the spectrum; and
  selecting at least one channel from each allowed sub-band.

14. A method of performing a startup operation for an access point in a regulatory domain, the regulatory domain having a frequency spreading requirement, the access point being allowed to communicate using allowed channels in a spectrum, the method comprising:
  (i) populating an allowed channel list with the allowed channels;
  (ii) populating a BSS-free channel list with allowed channels having acceptable levels of current WLAN transmission thereon;

(iii) populating a radar-free channel list using the BSS-free channel list, if possible, and otherwise the allowed channel list;
(iv) performing a radar scan on each channel in the radar-free channel list;
(v) deleting any channel with radar in the radar-free channel list;
(vi) repeating steps (i)-(v) until a predetermined number of channels remain in the radar-free channel list;
(vii) choosing a first channel in the radar-free channel list for operation; and
(viii) beginning operation with the first channel.

15. A method of switching channels for an access point operating in a 5 GHz spectrum, wherein the 5 GHz spectrum is divided into a first sub-band of 5150-5250 MHz, a second sub-band of 5250-5350 MHz, and a third sub-band of 5470-5725 MHz, the method comprising:
accessing a radar-free channel list;
if the access point is operating in the first sub-band, then setting a new channel to a most distant channel in the radar-free channel list; and
if the access point is operating in the second sub-band and at least one channel in the radar-free channel list is in the first sub-band, then setting the new channel to a lowest channel in the radar-free channel list.

16. A method of switching channels for an access point operating in a 5 GHz spectrum, wherein the 5 GHz spectrum is divided into a first sub-band of 5150-5250 MHz, a second sub-band of 5250-5350 MHz, and a third sub-band of 5470-5725 MHz, the method comprising:
accessing a radar-free channel list; and
setting a new channel to one of a most distant channel, a lowest channel, and a highest channel in the radar-free channel list,
wherein if the access point is operating in the second sub-band and no channel in the radar-free channel list is in the first sub-band, then setting the new channel to the highest channel.

17. A method of switching channels for an access point operating in a 5 GHz spectrum, wherein the 5 GHz spectrum is divided into a first sub-band of 5150-5250 MHz, a second sub-band of 5250-5350 MHz, and a third sub-band of 5470-5725 MHz, the method comprising:
accessing a radar-free channel list; and
setting a new channel to one of a most distant channel, a lowest channel, and a highest channel in the radar-free channel list,
wherein if the access point is operating in the third sub-band, then setting the new channel to the lowest channel.

18. A method of designating backup channels for a radar-free channel list usable by an access point operable in a spectrum, the method comprising:
determining candidate backup channels for the radar-free channel list;
performing a radar scan on each candidate backup channel until a radar-free channel is found and deleting any candidate backup channel from the radar-free channel list found with radar during the step of performing;
choosing the radar-free channel as a current channel and deleting the radar-free channel from the radar-free channel list;
sending beacons using the current channel;
allowing stations to authenticate and associate with the access point;
scanning other candidate backup channels in the radar-free channel using any associated stations that are willing to scan, or else the access point; and
designating candidate backup channels as backup channels and deleting candidate backup channels with radar from the radar-free channel list during the step of scanning.

19. The method of claim 18, wherein each associated station willing to scan performs a scan on only one candidate backup channel.

20. A method of performing a startup operation for an access point in a regulatory domain, the regulatory domain having a frequency spreading requirement, the access point being allowed to communicate using allowed channels in a spectrum, the method comprising:
(i) populating an allowed channel list with the allowed channels;
(ii) populating a BSS-free channel list with allowed channels having acceptable levels of current WLAN transmission thereon;
(iii) populating a radar-free channel list using the BSS-free channel list and the allowed channel list;
(iv) randomly selecting a first channel from the radar-free channel list;
(v) if the first channel is in a first sub-band and the regulatory domain exempts scanning in the first sub-band, then designating the first channel as a current channel, selecting a backup channel from the radar-free channel list in the first sub-band without scanning, and proceeding directly to (xi);
(vi) if the first channel is not in the first sub-band and the regulatory domain exempts scanning in the first sub-band, then performing a radar scan on each channel in the radar-free channel list, except any channel in the first sub-band;
(vii) if the first channel is in the first sub-band and the regulatory domain requires scanning in the first sub-band, then performing a radar scan on each channel in the radar-free channel list;
(viii) for steps (vi) and (vii), deleting any channel with radar in the radar-free channel list;
(ix) repeating steps (i)-(viii) until a predetermined number of channels remain in the radar-free channel list;
(x) after step (ix), choosing a first channel in the radar-free channel list for operation; and
(xi) beginning operation with the first channel.

* * * * *

UNITED STATES PATENT AND TRADEMARK OFFICE
CERTIFICATE OF CORRECTION

| | | |
|---|---|---|
| PATENT NO. | : 7,606,193 B2 | Page 1 of 1 |
| APPLICATION NO. | : 10/406049 | |
| DATED | : April 2, 2003 | |
| INVENTOR(S) | : William J. McFarland et al. | |

It is certified that error appears in the above-identified patent and that said Letters Patent is hereby corrected as shown below:

Column 1, line 54, amend "Dec. 6, 2001" to -- Dec. 31, 2001 --.

Signed and Sealed this

Second Day of March, 2010

David J. Kappos
*Director of the United States Patent and Trademark Office*